United States Patent [19]
Bullard et al.

[11] Patent Number: 6,077,378
[45] Date of Patent: Jun. 20, 2000

[54] METHOD OF FORMING DENSIFIED FIBER BATT WITH COIL SPRINGS INTERLOCKED THEREIN

[75] Inventors: Larry I. Bullard, Winston-Salem, N.C.; James P. Whitaker, Germantown, Tenn.; Sidney A. Hiatt, Carthage, Mich.

[73] Assignee: L&P Property Management Company, South Gate, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/910,515

[22] Filed: Aug. 2, 1997

Related U.S. Application Data

[63] Continuation-in-part of application No. 08/463,223, Jun. 5, 1995, abandoned, which is a continuation-in-part of application No. 08/097,557, Jul. 27, 1993, abandoned.

[51] Int. Cl.[7] .......................... B29C 65/02; B29C 65/44
[52] U.S. Cl. .............................. 156/252; 5/716; 5/720; 5/655.8; 156/62.2; 156/62.8; 156/292; 156/293; 156/298; 156/303.1; 156/309.6; 156/321; 297/452.51; 442/409
[58] Field of Search ................................ 156/62.2, 62.8, 156/252, 269, 270, 292, 293, 298, 303.1, 309.6, 321; 297/452.5, 452.51; 5/716, 718, 720, 655.7, 655.8; 428/74, 119, 138, 222; 442/376, 409

[56] References Cited

U.S. PATENT DOCUMENTS

| | | |
|---|---|---|
| 0,590,328 | 9/1897 | Muller . |
| 2,385,870 | 10/1945 | Lashar et al. . |
| 2,500,282 | 3/1950 | Francis, Jr. . |
| 2,540,441 | 2/1951 | Gordon . |
| 2,874,389 | 2/1959 | Koenigsberg . |
| 3,291,677 | 12/1966 | Coates et al. . |
| 3,401,411 | 9/1968 | Morrison . |
| 3,665,530 | 5/1972 | Basner . |
| 3,806,576 | 4/1974 | Richardson et al. . |
| 3,837,985 | 9/1974 | Chase . |
| 4,136,275 | 1/1979 | McCullough . |
| 4,631,104 | 12/1986 | Jackson . |
| 4,668,562 | 5/1987 | Street . |
| 4,753,693 | 6/1988 | Street . |
| 4,771,495 | 9/1988 | Distler et al. . |
| 4,811,439 | 3/1989 | Siegel et al. . |
| 4,862,540 | 9/1989 | Savenije . |
| 5,233,663 | 8/1993 | Wood . |
| 5,327,596 | 7/1994 | Wallace et al. . |
| 5,749,133 | 5/1998 | Mauldin et al. . |

FOREIGN PATENT DOCUMENTS

| | | |
|---|---|---|
| 1331547 | 12/1963 | France . |
| 5-56829 | 3/1993 | Japan . |
| 7808781 | 2/1980 | Netherlands . |
| 0493356 | 10/1938 | United Kingdom . |
| WO88/00258 | 1/1988 | WIPO . |

OTHER PUBLICATIONS

Translation of NL 7808781.
Whittington's Dictionary of Plastics, 1968, pp. 59, 60.
Hoechst Celanese Brochure: "Textile Fibers Group Hoechst Celanese Corporation", Dec. 1988, two pages.

*Primary Examiner*—Steven D. Maki
*Attorney, Agent, or Firm*—Wood, Herron & Evans, L.L.P.

[57] ABSTRACT

A resilient structure such as a seat cushion, mattress, furniture back or the like has enhanced resiliency and support at strategic locations due to the use of coil springs interlocked and held within a densified heat bonded low melt fiber batt used as the core or cover of the resilient structure. The densified fiber batt core includes low melt fibers which, when heated to the melting point and then cooled, intersect and interlock with the coil springs. The coil springs function as an integral part of the fiber batt, eliminating the need for lattice wires and the like to interlock the springs in the structure. The invention also increases the capability of manufacturing resilient structures in a wide variety of shapes and sizes.

6 Claims, 6 Drawing Sheets

METHOD OF FORMING DENSIFIED FIBER BATT WITH COIL SPRINGS INTERLOCKED THEREIN

This is a continuation-in-part application based on application Ser. No. 08/463,223, entitled "Densified Fiber Batt With Coil Springs Interlocked Therein", filed on Jun. 5, 1995, now abandoned, which was a continuation-in-part application of application Ser. No. 08/097,557, entitled "Densified Fiber Batt With Coil Springs Interlocked Therein", filed on Jul. 27, 1993, now abandoned.

FIELD OF THE INVENTION

This invention relates to a resilient structure such as a seat cushion, furniture back or mattress. More particularly, this invention relates to a resilient structure comprising a densified heat bonded low melt fiber batt having enhanced resilience and/or support in strategic areas.

BACKGROUND OF THE INVENTION

Non-woven fiber batt has a demonstrated usefulness in a wide variety of applications. This material has been used in manufacturing scouring pads, filters, and the like, but is particularly useful as a filler material in various personal comfort items such as stuffing in furniture, mattresses and pillows, and as a filler and insulation in comforters and other coverings. One of the inherent characteristics of fiber batt is its cushioning ability due to the large amount of air space held within the batt material. The air space defined within the fiber batt acts as a thermal insulation layer, and its ready displaceability allows support in furniture, mattresses and pillows.

Typically, the fiber batt is produced from a physical mixture of various polymeric fibers. The methods for manufacturing the batt are well known to those skilled in the art. Generally, this method comprises reducing a fiber bale to its individual separated fibers via a picker, which "fluffs" the fibers. The picked fibers are homogeneously mixed with other separated fibers to create a matrix which has a very low density. A garnet machine then cards the fiber mixture into layers to achieve the desired weight and/or density. Density may be further increased by piercing the matrix with a plurality of needles to drive a portion of the retained air therefrom.

A resilient structure such as a seat, a furniture back or a sleeping surface must be able to support a given load, yet have sufficient resilience, or give, to provide a degree of comfort. For these structures, a densified heat bonded low melt fiber batt may be used to form an inner core, or as a covering. To provide the necessary support, a certain fiber density must be built into the fiber batt. If the fiber density is too high, the seat cushion or mattress will have sufficient rigidity but it will be too firm. If the fiber mass is less dense, it will be more comfortable. However, it will not be as durable and will be more susceptible to flattening out after use. Thus, while fiber batting has a number of well-recognized advantages, it is difficult to achieve a high degree of structural support and/or comfort for a resilient structure with a covering or core made from a densified heat bonded low melt fiber batt.

To minimize these limitations, it is common to combine a fiber batt with an interconnected wire lattice. For instance, mattresses often include a wire lattice sandwiched between two layers of fiber batting. The wire lattice provides a high degree of structural rigidity. Resiliency can be built into the wire lattice by including coil or leaf springs at various locations. To do this, the lattice may include a plurality of internal coils interconnected by border wire and anchoring springs.

While a resilient structure with an interconnected wire lattice of this type has many desirable features, it requires a relatively large quantity of steel. Moreover, its manufacture and construction also requires relatively complex machinery to form and interconnect the steel. The overall cost of a typical mattress of this type reflects the relatively high quantity of steel used to make the support lattice and the complexity of the required machinery.

Additionally, for some resilient structures with an interconnected lattice, including mattresses, it is desirable to provide more support in strategic areas. This option further increases the costs associated with manufacture, due to the variation in the lattice structure and/or assembly at these areas with enhanced rigidity. While the higher costs associated with these more complex machines may be economically justified for mattresses, which have standard sizes and shapes and can be made in mass quantity, it usually cannot be justified for a number of other nonstandard sized resilient structures, such as seat cushions, furniture backs and the like. As a result, the size and shapes of resilient structures with enhanced rigidity have been limited.

SUMMARY OF THE INVENTION

It is an objective of this invention to enhance, at strategic areas, the resilience and/or support of a seat cushion, mattress, furniture back, or the like, thereby to promote both comfort, sturdiness and durability.

It is another objective of the invention to reduce the quantity of steel and the complexity of machinery necessary to produce a comfortable and sturdy seat cushion, mattress or furniture back.

It is still another objective of the invention to produce a comfortable and sturdy seat cushion, mattress or furniture back without having to form and interconnect a wire lattice.

It is still another objective of the invention to increase the variety of sizes and shapes of resilient structures which have enhanced rigidity and/or resilience at strategic areas.

The above-stated objectives are achieved by interlocking one or more coil springs at predetermined positions in a batt made of moderately densified fiber, thereby to provide strategic support and/or resilience at the predetermined positions.

The coil springs are interlocked in place within the fiber batt via melted interconnection with low melt fibers contained therein. The coil springs interlock directly with the fiber bats, and they do not interconnect to each other, or to any other structure.

One phenomenon of a densified heat bonded low melt fiber mass is its impenetrable characteristic. Once cured within the fiber bats, the coil springs will remain locked in a desired compressible position and will function as part of the total fiber mass when compressed and then released. The interlocked springs add desired resilience and/or weight distribution at the strategic positions, and the coil springs can be located and oriented in a manner which overcomes the undesirable characteristics of a too firm seat cushion or mattress, or a too soft, less durable cushion or mattress. In the context of the description of the invention as set forth in this specification, the terms "cure" and "resolidify" are used interchangeably, both terms signifying that the heated and melted fibers cool and regain their solid form which they had prior to being heated and melted.

According to a first preferred embodiment of the invention, a moderately densified heat bonded low melt fiber batt is initially formed. This can be done by mixing low melt and high melt fibers or by using a dual fiber having a high melt core surrounded by a low melt sheath. Thereafter, heated coil springs are screwed into the densified heat bonded low melt fiber batt at predetermined positions. The heated coil springs melt some or all of the surrounding low melt fibers, i.e., the fibers located adjacent the predetermined positions. During resolidifying or curing, the low melt fibers interlock with the coil springs to hold and encapsulate the coil springs in place within the fiber batt.

Preferably, the fiber batt is compressed after insertion of the springs, or while the springs are still hot, and until curing is completed. Additional protective layers of densified fiber batt may be placed on the top and bottom surfaces of the fiber batt to cover the ends of the springs, prior to compression. The fiber batt with interlocked coil springs may then be sandwiched and sewn between two covers, preferably of cloth, to form the external surface of a chair, bed, sofa, etc.

Because the coil springs are interlocked or encapsulated in with the fiber batt, the resulting resilient structure has enhanced resiliency and/or sturdiness at the desired strategic areas.

In addition to inserting heated coil springs into the fiber batt to cause melting of the low melt fiber and thereby interlock the coil springs, the coil springs may also be inserted cold, with the densified heat bonded low melt fiber batt and inserted springs heated thereafter to affect interlocking.

As another alternative, heated guide elements, preferably tubes, having coil shapes similar to the coil springs may be threadably screwed into a first side of the densified heat bonded low melt fiber batt, through the batt and out the second side. While in place, the heated guide elements melt some or all of the low melt fibers located adjacent the positions to be occupied by the coil springs. The coil springs are then attached to the guide elements at the second side of the batt, as by insertion into the ends of the tubes. The guide elements are then unscrewed back out the first side, thereby pulling the coil springs into the fiber batt from the second side. Thereafter, the fiber batt is compressed and the already melted low melt fibers cure to interlock or encapsulate with the coil springs and hold them in place.

As yet another alternative, with the coil springs positioned in a predetermined enclosable volume, the fibers of the densified fiber batt may be blown around the coil springs with hot or cold air, thereby to fill up the volume and enclose the coil springs within a fiber mass. Thereafter, the fiber mass with the coil springs therein is heated to a temperature sufficient to melt the low melt fibers. After curing and compression, the coil springs will be interlocked with the low melt fiber blend.

As still another embodiment of this invention, hollows having a desired shape are stamped into the densified fiber batt, preferably during heating and cooling of the batt. Coil springs are then located in the hollows, and one or more covering layers of the fiber batt are placed over the ends of the springs. Preferably, hollows are separately stamped into separate top and bottom pieces of the batt, and the two stamped pieces are then sandwiched to enclose the springs, with the hollows aligned. Then heat and compression and/or heating, cooling and compression are applied to the fiber batt. This method interlocks the springs in place within the hollows in the fiber batt. Perhaps more importantly, this embodiment may be readily performed along a production line, by mounting the stamping dies on an endless conveyor located above the production path of the batt pieces.

In a variation of this embodiment, a plurality of intersecting slit patterns are made in the fiber batt, from one side thereof. Preferably, each intersecting slit pattern has two slits which define a cross shape. The springs are then inserted into the slit patterns until the endmost turns of the springs lie flush with or slightly above the top and bottom surfaces of the batt. Additional layers of fiber batt or foam may be adhered to the top and bottom surfaces and to the endmost turns of the springs to interlock the springs within the batt. Preferably, knotted hour-glass type springs are used, and the wedge-shaped segments of fiber batt created by the cross-shaped slits fill in between the turns of each spring to interlock the spring in the batt without the necessity of heating and cooling the batt and/or spring. However, heat and compression and/or heating, cooling and compression may be applied to the fiber batt, as described previously, before or after the additional layers are placed on the batt.

If used as the core of a seat cushion or mattress, the densified fiber batt will have relatively flat top and bottom surfaces and a rectangular perimeter.

The interlocked coil springs provide enhanced resilience and/or rigidity at strategic areas of the structure. Because each of the coil springs is individually interlocked and held in a desired orientation and position, this invention reduces the quantity of steel and/or fiber required to produce a seat cushion, mattress, furniture back or the like.

Moreover, because this invention eliminates the need for machinery and components associated with the manufacture of a wire lattice, this invention simplifies the production of a resilient structure such as a mattress, seat cover, furniture back having enhanced resilience, sturdiness and durability.

Additionally, because this invention greatly simplifies the manufacture of resilient structures and eliminates the need for complex machinery to make particular sizes and shapes, this invention vastly increases the variety of sizes and shapes of resilient structures.

These and other features of the invention will be more readily understood in view of the following detailed description and the drawings.

DETAILED DESCRIPTION

According to a preferred embodiment of the invention, applicant uses a moderately densified heat bonded low melt fiber batt as a starting material. Such a fiber batt may be formed from a bale of dual polymer fibers 30 as shown in FIG. 1A, such as Celbond® staple fibers, manufactured by Hoechst Celanese Corporation. Alternatively, high melt or heat stable fibers may be mixed with low melt fibers. Preferably, if a dual polymer fiber is used, a bale of the dual polymer fibers is picked and fluffed to a desired degree, then tumbled and fed to a feed hopper. Thereafter, the fiber mass is carded by a garneting machine until a desired volume and/or density is achieved, as is known in the industry.

Densifying a fiber batt of this type involves various stages of heating and compressing to form a predetermined shape. The Celbond® dual polymer fiber includes a low melt polymer sheath which surrounds a thermally stable polyester core. When heated, compressed and allowed to cure, the external sheaths randomly adhere to surrounding fibers to densify and rigidify the resulting fiber batt. The density or rigidity of the fiber batt depends upon the duration and magnitude of compression, and the density may be varied to suit the use or application of the resulting resilient structure.

This invention involves interlocking a plurality of coil springs at selected locations and orientations in a moderately densified heat bonded low melt fiber batt of this type. Generally, the interlocking process includes heating the densified fiber batt at a temperature and for a duration sufficient to melt the low melt fibers, and then curing the fiber batt to allow the low melt fibers to interlock with and hold at least one coil spring in place. Compression during curing further densifies the batt and helps to achieve the desired final shape.

Figure 1:
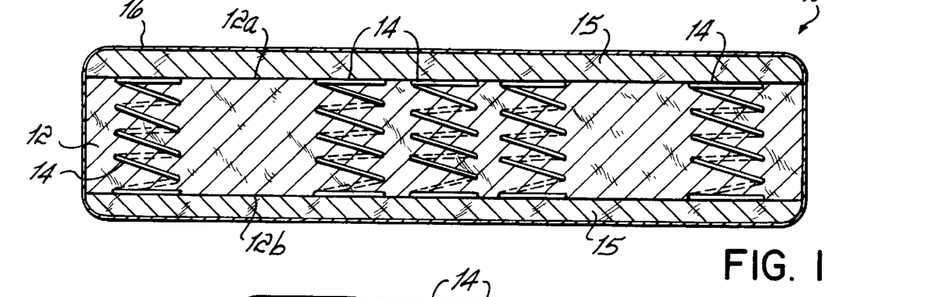
FIG. 1 is a cross sectional view of a resilient structure such as a seat cushion, furniture back, mattress or the like which employs a densified fiber batt with interlocked coil springs held therein, in accordance with the invention
Figure 1A:
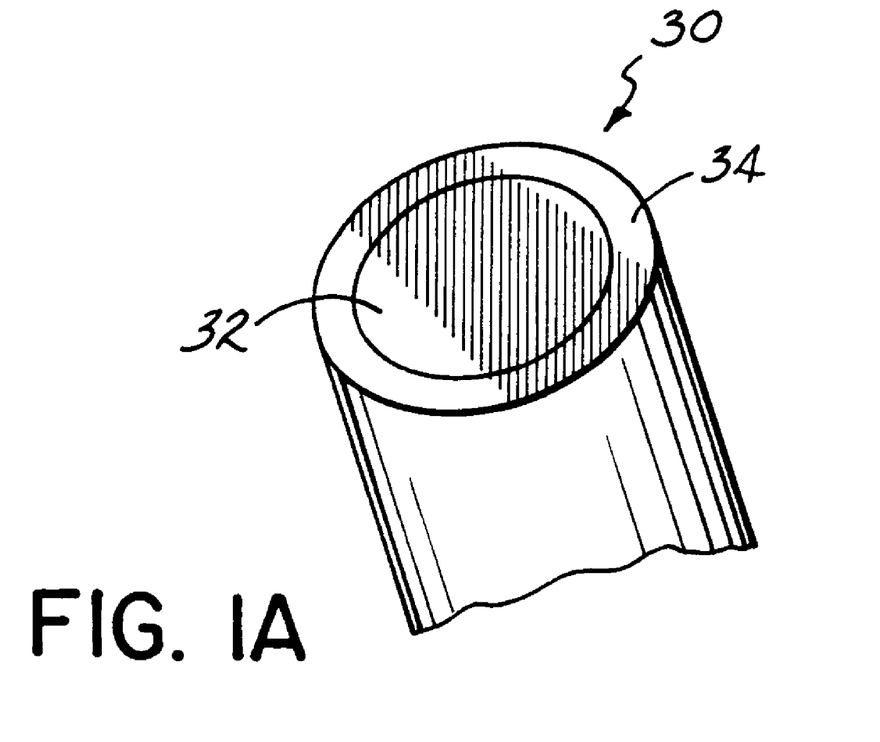
FIG. 1A is a schematic perspective view of the end of a dual-polymer fiber suitable for forming the fiber batt of FIG. 1.

FIG. 1 illustrates a resilient structure 10 in accordance with the invention. This resilient structure 10 is suitable for use as a seat cushion, or even a mattress, depending upon the length and width dimensions. The resilient structure 10 has a core 12 formed primarily of a moderately densified heat bonded low melt fiber batt into which a number of coil spring 14 are interlocked. The core 12 has a three dimensional shape which is dictated by the particular size and shape of the resilient structure 10. Generally, the core 12 will have a rectangular outer perimeter, with relatively flat top and bottom surfaces, relatively uniform thickness, and will be oversized with respect to the final volume that it occupies in the resilient structure 10. The core 12 is oversized because the fiber batt and coil springs 14 are usually compressed during manufacture to achieve the desired final shape.

The rest of the resilient structure 10 includes one or more additional core-sandwiching layers 15 which cover the ends of the springs 14. These layers may also be of densified heat bonded low melt fiber batt, and, along with the core 12, these layers may also be heated and then compressed during curing. One or more external covers 16, sometimes referred to as a "topper", protect the external surfaces of the resilient structure 10.

Figure 2:
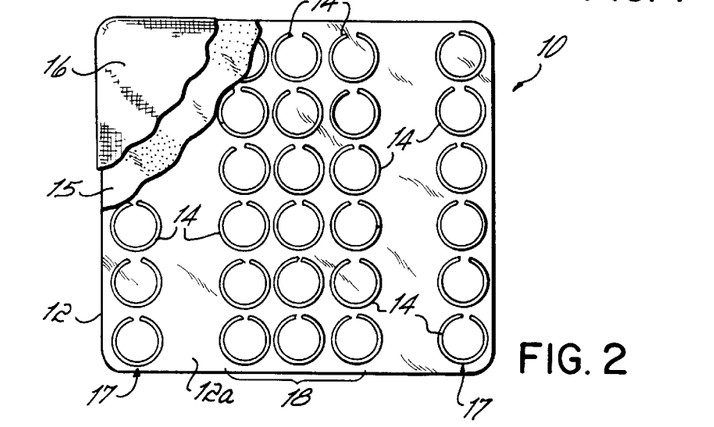
FIG. 2 is a diagrammatic top view of the resilient structure partially in cross section.

FIG. 2 shows a cross sectional view through the core 12 and the springs 14. FIG. 2 shows that the arrangement of the coil springs 14 provides two relatively thin outer regions 17 of enhanced support and one relatively thick inner region of enhanced support 18 for the resilient structure 10. Other arrangements could also be used, depending upon the use of the structure 10 and the desired areas for enhanced support.

The coil springs 14 may be threadably screwed into either a first or second side, 12a or 12b, respectively (the top or bottom), of the fiber batt core 12. If desired, the coil springs 14 may be heated prior to this step. Alternatively, the core 12 may be heated with the springs 14 screwed therein. The heat causes a portion of the low melt fibers surrounding the springs 14 to melt and intersect therewith. After the heat dissipates, the low melt fibers cure in contact with the coil springs 14 along substantially their entire lengths to interlock them in the desired position and orientation within the fiber batt core 12.

Figure 3:
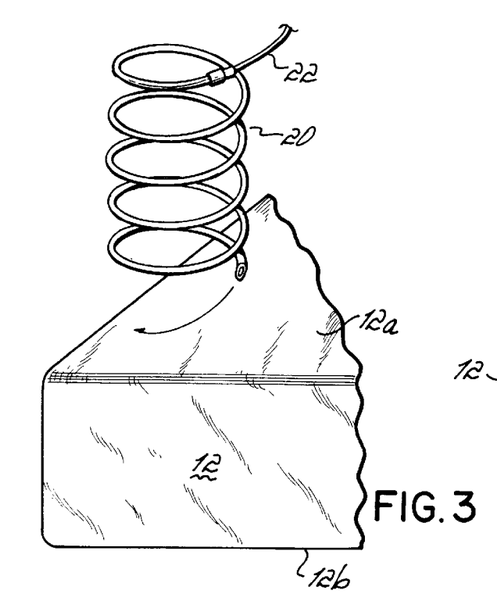
FIGS. 3, 4, 5 and 6 depict a sequence of steps for locating coil springs within a fiber batt core in accordance with one embodiment of the invention.

FIG. 3 illustrates another manner of locating the coil springs 14 in the fiber batt core 12, wherein the fiber batt core 12 is heated via a resistive guide element 20, preferably a helical tube, which contains an electrical resistance heater. The helical tube 20 has the same shape or a shape similar to the coil springs 14 and connects to an electrically conductive cable 22, which supplies electrical current. After heating the fiber batt core 12 via the helical tube 20, the helical heater 20 is removed, and the coil springs 14 threaded therein via the voids created by the helical tubes 20.

Figure 4:
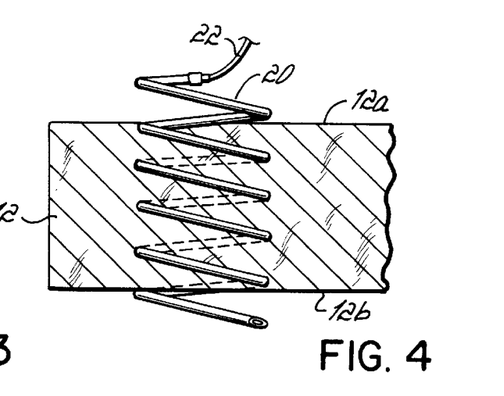

Preferably, according to this embodiment, the helical tubes 20 are screwed into the first side 12a of the core 12 and out the second side 12b, so that the opposite ends of the tube 20 extend beyond both sides of the fiber batt core 12, as shown in FIG. 4. After energizing the tubes 20 to melt the surrounding low melt fiber blend, the coil springs 14 are inserted into the open ends of the helical tubes 20 at the second 12b side of the fiber batt core 12. Thereafter, threaded removal of the helical tubes 20 out of the fiber batt 12 from side 12a pulls the coil springs 14 into the fiber batt core 12 from the second side 12b, as shown by directional arrows 24 and 25 in FIG. 5. The entering coil springs 14 traverse portions of the core 12 which have already been hollowed out and heated by the tubes 20.

Figure 5:
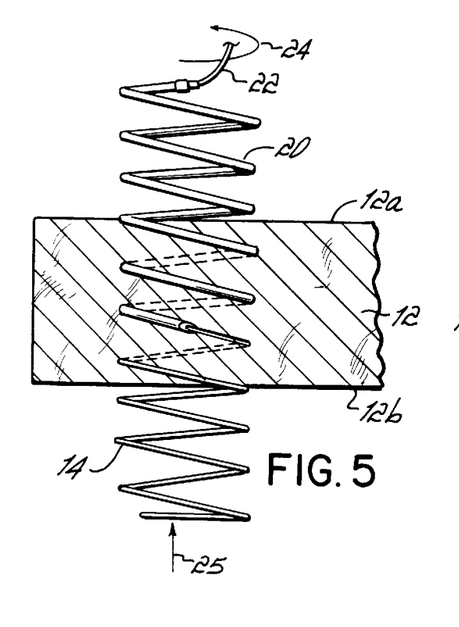
Figure 6:
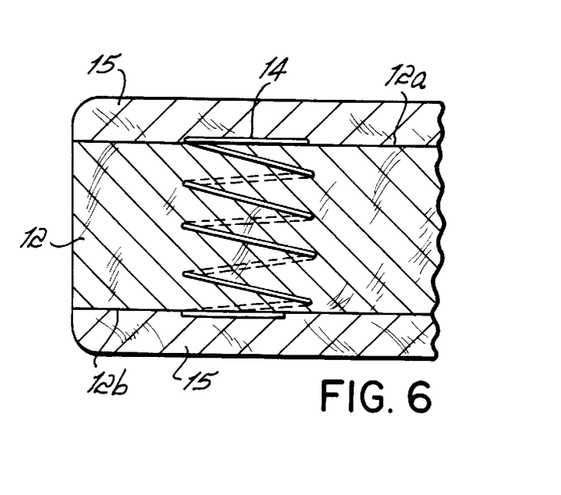

The resulting core 12 may then be sandwiched on sides 12a and 12b between two insulative layers 15. These insulative layers 15 cover the ends of the springs 14. These layers 15 may also be of densified heat bonded low melt fiber batt and may be positioned prior to compression and final curing.

According to another preferred embodiment of the invention, the coil springs 14 may be located at predetermined positions within a predetermined three dimensional volume. Thereafter, a fiber mixture which includes low melt fibers may be blown into the predetermined volume to fill the volume to a preferred density. The fibers may be blown in with either hot air or cool air. Thereafter, supplying heat to the predetermined volume causes the low melt fibers to melt into contact with the coil springs 14 and, after curing, to interlock the coil springs 14 with the fibers. Preferably, during the heating stage, the predetermined volume is also compressed to density the fiber batt 12, and to partially compress the coil springs 14.

For each of these previously described embodiments, the heat bonded low melt fiber batt 12 and encapsulated coil springs 14 are preferably compressed during the curing stage, or during the heating and curing stages to further densify the fiber batt 12, and, if desired, to partially compress the coil springs 14.

According to another alternative embodiment, hollows, or holes, of predetermined shape and location may be stamped into the fiber batt core 12, and the coil springs 14 may then be located within the holes. If desired, one or more covering layers 15 of densified heat bonded low melt fiber batt 14 may be placed over the ends of the coil springs 14, at the top and/or bottom sides 12a and 12b of the core 12. The fiber batt core 12 and coil springs 14 are then heated to melt the low melt fibers into contact with the adjacently located coil springs 14. After heating, the core 12 and additional layers 15 are compressed and cured to lock the coil springs 14 therein.

Figure 7:
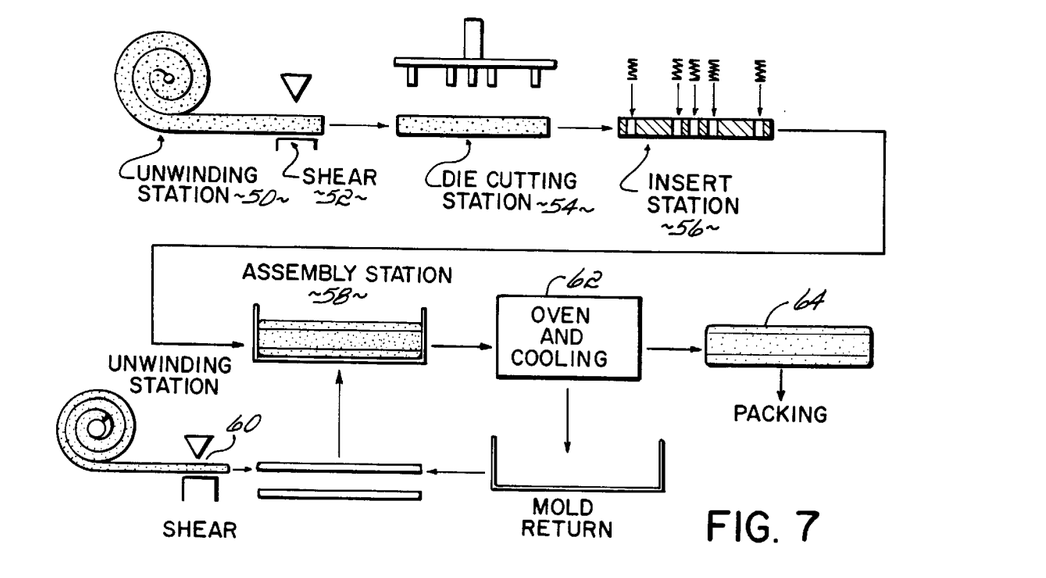
FIG. 7 is a plan view which schematically depicts a production line for constructing the invention in accordance with another embodiment of the invention.

This embodiment is particularly suitable for a production line, as illustrated in FIG. 7. Slightly densified rolls of the heat bonded low melt fiber batt are mounted on an unwinder 50 and fed into a shear 52 that cuts pieces to a specified length. These pieces are then taken to a die cutting station 54 that cuts round plugs out in specified locations. Upon completion, the piece is then moved along the assembly line to an insertion station 56, where either Marshal type coils or Bonnell type coils are inserted in the areas of the round plugs. The piece is then moved to a mold assembly station 58. Here the piece is sandwiched between two outer, slightly densified pieces which have already been cut by a second shear station 60, and all three pieces are placed within a mold. The mold is then sent through an oven 62, which laminates and compresses the three layers while in the mold to produce a finished densified cushion. The finished cushion is then cooled and removed from the mold at station 64, then packaged for warehousing or shipment. The mold is returned to the production line, as indicated by mold return station 66.

Figure 8:
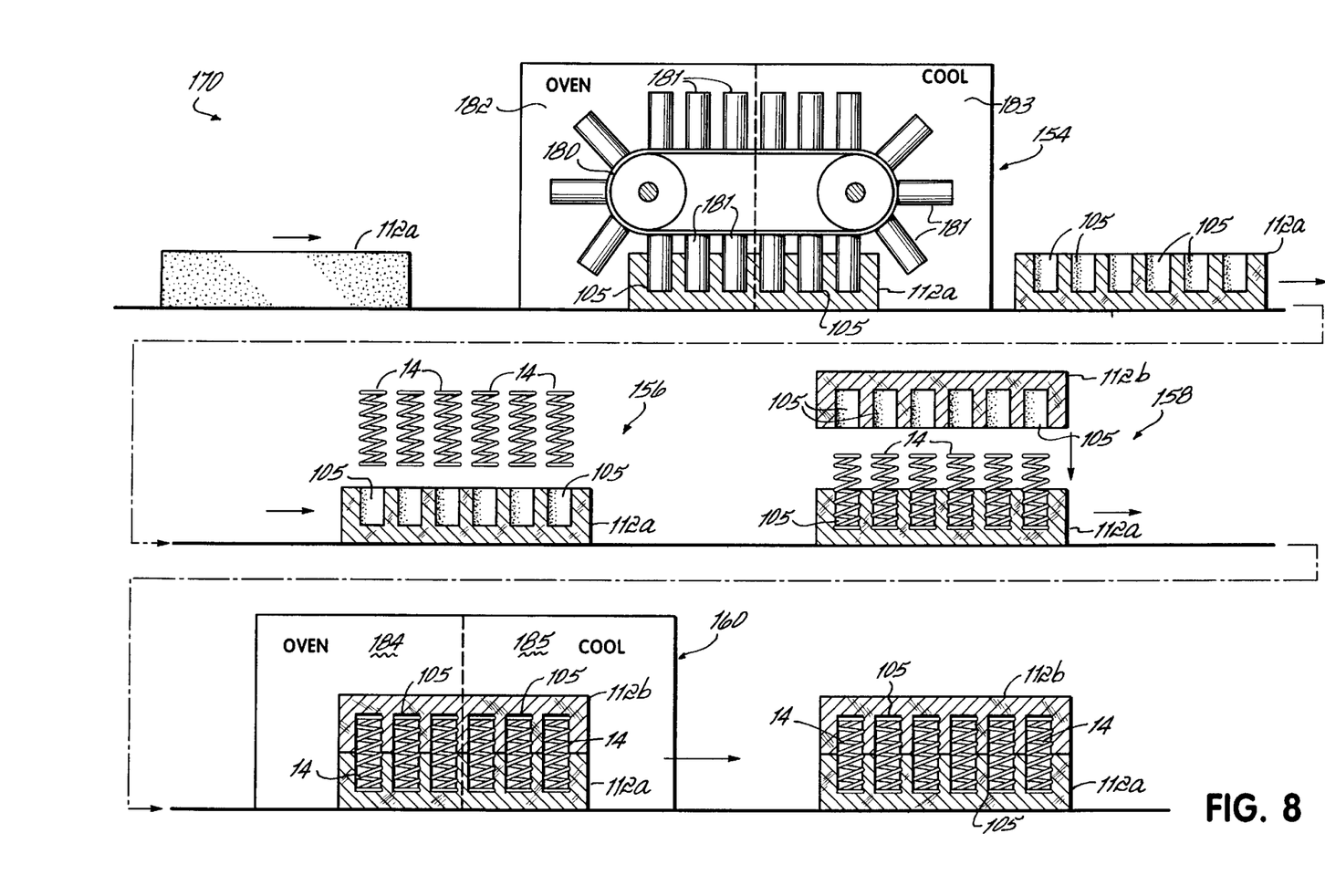
FIG. 8 is a plan view, similar to FIG. 7, which schematically depicts another embodiment for constructing the invention along a production line.

FIG. 8 schematically shows another manner of making this invention along a production line. The sequence of production steps is somewhat analagous to those depicted in FIG. 7. More specifically, FIG. 8 shows a production line 170, which includes a die cutting station 154, an insertion station 156, an assembly station 158 and a joining station 160. The die cutting station 154 includes an endless conveyor 180 with stamping dies 181 mounted thereon. Preferably, the endless conveyor 180 extends into both an oven, or heating chamber 182 and a cooling chamber 183.

In operation, a core piece 112a of slightly densified heat bonded low melt fiber batt which has been cut from a roll (as from an unwinding station 50, shown in FIG. 7) is conveyed into the stamping station 154. The endless conveyor 180 stamps hollows 105 into the piece 112a via stamping dies 181, with the speed of the endless conveyor 180 matched to the speed at which the piece 112a is conveyed. Heating occurs during initial stamping in heating chamber 182, followed by cooling in cooling chamber 183. This provides hollows 105 of the desired shape and size.

Thereafter, springs 14 are inserted into the hollows 105 at an insertion station 156, followed by placement of a second piece 112b with hollows 105 therein on top of piece 112a and the springs 14, which occurs at an assembly station 158. Preferably, the springs 14 have a vertical dimension about two times that of the hollows 105. The hollows 105 are preferably cut into the second piece 112b in the same manner as the first piece 112a. This may be done on a separate production line (not shown), or simply by using the next succeeding piece out of the die cutting station 154 and inverting it for placement on the first piece 112a. With either option, the assembly at the assembly station 158 may be performed manually, or automatically if desired. Similarly, the insertion of the springs 14 at the insertion station 156 may either be performed manually or automatically.

After assembly, the sandwiched pieces 112a and 112b and the springs 14 are conveyed through a final forming or joining station 160 which includes a heating chamber 184 and a cooling chamber 185. This solidifies the two pieces 112a and 112b in sandwiching arrangement about the springs 14. During conveyance through heating chamber 184 and/or cooling chamber 185, compression may also be used to enhance rigidity, as shown in FIG. 7.

With this method, because the hollows 105 are initially formed during heating and cooling and the operation of the stamping dies 181 compresses the bottoms of the hollows 105, the bottom portions of the hollows are substantially firmer and stronger than the rest of the piece 112a or 112b. This eliminates the need to use an insulator pad to prevent the springs 14 from poking through either of the pieces 112a or 112b. Alternatively, if insulator pads are still used, they may be substantially thinner and require substantially less material than previously thought to be necessary. Thus, this embodiment results in a cost savings to the manufacturer.

Figure 9:
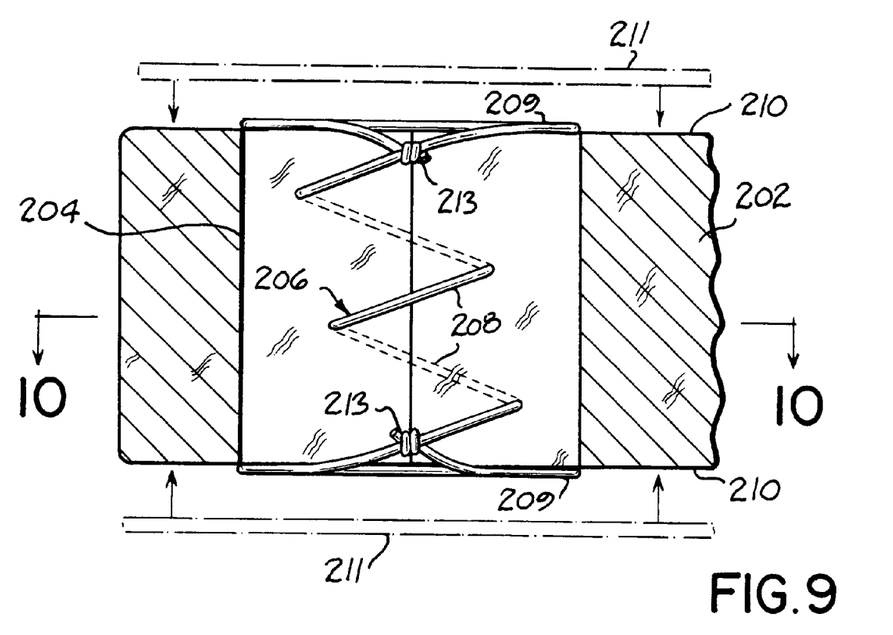
FIG. 9 is a cross-sectional view of a resilient structure manufactured by yet another method of production in accordance with the principles of the invention, showing a knotted hour-glass coil spring after it has been inserted into the fiber batt at the location of an X-cut made in the batt.
Figure 10:
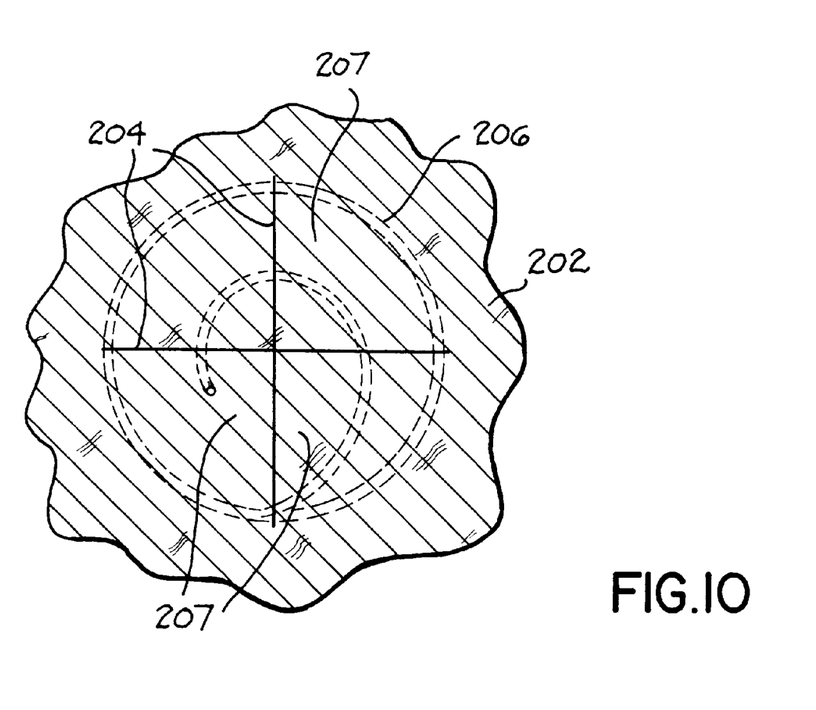
FIG. 10 is a cross-sectional view taken along line 10—10 of FIG. 9.
Figure 11:
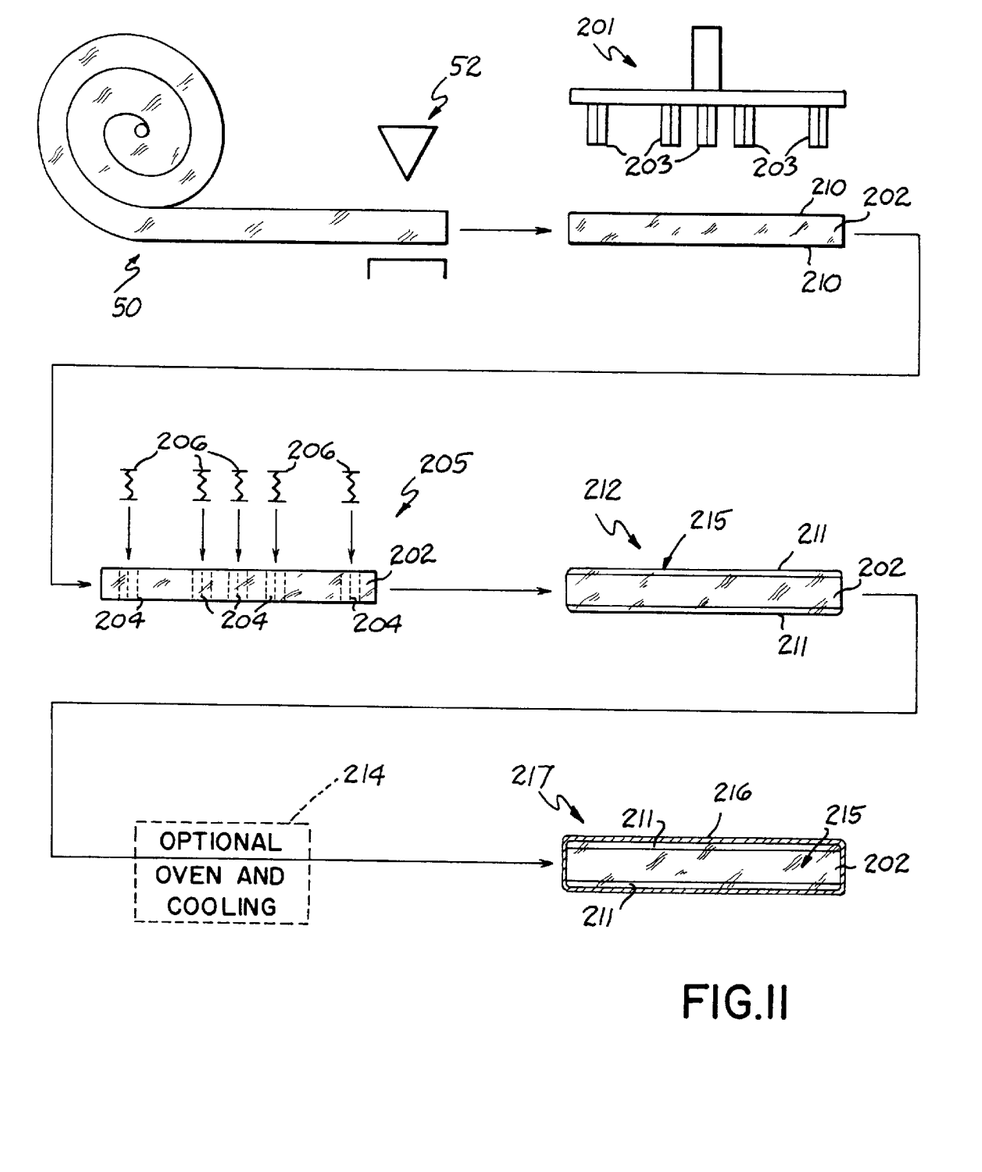
FIG. 11 is a plan view which schematically depicts another embodiment for constructing the invention along a production line.

FIG. 11 depicts yet another alternative method for making a resilient structure in accordance with the principles of the invention, and FIGS. 9 and 10 depict a resilient structure made by the process of FIG. 11. With reference to FIG. 11, the unwinding station 50 and shear station 52 are essentially the same as those of FIG. 7. However, at the die cutting station 201, the cutting heads, rather than being configured for cutting hollows in the batt 202, instead are configured as X-shaped or cross-shaped blades 203. The blades 203 thereby form X-cuts 204 in the batt 202 without removing any material from the batt 202. The X-cuts 204 define the locations at which coil springs will reside in the batt when the resilient structure is completed. Thus, at the insert station 205, coil springs 206 are forced into the batt 202 at the locations of the X-cuts 204.

FIG. 9 depicts in vertical cross-section a portion of the batt 202 with a coil spring 206 inserted in an X-cut 204, and FIG. 10 depicts a fragmentary horizontal cross-section through the structure of FIG. 9. As a result of forming the X-cut 204, four wedge-shaped segments 207 of fiber batt are created. These segments 207 are forced out of the way of the coil spring 206 as the spring is being inserted into the batt 202. However, once the spring 206 is fully inserted into the batt 202, the segments 207 spring back toward their original locations, thereby filling in the spaces between the turns of the spring 206. This has several benefits. First, the intrusion of the segments 207 between the turns of the spring 206 tends to keep the spring upright so that it does not tilt or turn sideways. The segments 207 also tend to prevent the spring 206 from screwing its way out of the batt 202. Second, the fibers of the batt which fill in the spaces surrounding the turns of the spring 206 tend to reduce spring noise. Third, greater support is provided by the structure at the location of the spring 206, relative to a similar structure having the spring located in a hollow stamped out of the batt such as shown in FIG. 7.

With respect to the support benefit, stamping a plug of fiber batt out of the batt to create a hollow for receiving a spring causes a loss of fiber material, which results in loss of support provided by the batt itself at that location. Furthermore, when a spring resides within a hollow in the batt, it is possible by exerting sufficient force to completely depress the spring down to its "solid height" (i.e., with the adjacent turns of the spring contacting each other). In contrast, with the method of FIG. 11, no material is removed from the batt 202, and therefore the batt does not lose support at the spring location. Moreover, with the structure made by the method of FIG. 11, the fiber batt segments 207 fill in between the adjacent coil turns, thereby preventing the spring from being compressed to its solid height. Consequently, all other factors being equal, a resilient structure made by the method of FIG. 11 provides greater support at the spring locations than a similar structure made by the method of FIG. 7.

The coil springs 206 preferably are hour-glass type, as shown in FIGS. 9–11, having a middle section with turns 208 whose diameter is smaller than that of the endmost turns 209. These coil springs are known in the industry as Marshal type springs. The reduced diameter of the middle section of spring 206 permits the wedge sections 207 of fiber batt 202 more readily to fill in the middle section of the spring 206. The endmost turns 209 preferably lie flush with or slightly above the outer surfaces 210 of the batt 202. Additional resilient layers 211 are then adhered to the outer surfaces 210, as shown at the assembly station 212 of FIG. 11 and in FIG. 9. The additional layers 211 may comprise layers of fiber batt, layers of foam, or any suitable resilient material. The layers 211 adhere to the batt surfaces 210, and also adhere to the endmost turns 209 of the spring 206, thereby interlocking the spring 206 in place within the batt 202.

The springs 206 preferably are "knotted" springs, having the ends 213 of the wire secured to the endmost turns 209 by wrapping the ends 213 around the turns 209. Thus, each endmost turn 209 forms a closed loop which lies flush with or slightly above the batt surfaces 210. The closed loops of the endmost turns 209 tend to spread loads across the top and bottom surfaces 210 of the batt 202. Additionally, knotted springs are resistant to screwing themselves out of the batt 202. Such knotted springs are known in the industry as Bonnell type springs.

When the additional layers 211 are fiber batt having both high-melt and low-melt components, the layers 211 may be adhered to the batt 202 by heating the batt 202 and layers 211 to melt the low-melt components of the batt 202 and the layers 211, and then cooling the assembly to cause the low-melt components to cure or resolidify to each other and to the springs 206, as shown in the optional oven and cooling station 214 of FIG. 11. Some of the low-melt components of the additional layers 211 adhere to the fibers at the surfaces 210 of the batt 202, and vice versa, and low-melt components of both the additional layers 211 and the batt 202 adhere to the springs 206 along substantially the entire lengths of the springs 206. The layers 211 are thus adhered to the batt 202 and the springs 206 are securely interlocked in the batt 202.

Alternatively, the heating and cooling step may be omitted, and the additional layers 211 may be adhered to the batt 202 by adhesive joining or any other suitable technique. This method is particularly advantageous when the additional layers 211 are made of a material such as foam which cannot withstand the temperatures required to cause melting of the low-melt components of the batt 202.

Still another variation on the basic method is to heat and cool the batt/spring assembly which emerges from the insert station 205 to cause melting and resolidifying of the low-melt components of the batt 202 so as to interlock the springs 206 in the batt 202, and then proceed to the assembly station 212 where additional layers 211 are adhered to the outer surfaces 210. It will also be appreciated that the assembly station 212 may be omitted if additional layers 211 are not required.

Once the batt/spring assembly is completed, including any additional layers 211, the assembly 215 is then covered with a suitable covering material 216 at the covering station 217 to complete the fabrication of a resilient structure such as a cushion or mattress.

Applicant has found this invention to be particularly advantageous in the forming of seat cushions for airplanes. Because of the density of the fiber batt core and the weight distribution, resiliency and support provided by the interlocked coil springs, airplane seat cushions made according to this invention method can withstand repeated use over a relatively long period of time. Perhaps more importantly, because of the flame resistant and fire retardant characteristics of certain fibers which may form the densified heat bonded low melt fiber batt core, airplane seat cushions made according to this invention are safer than prior seat cushions which have generally been made of flammable material.

EXAMPLE ONE

To make a resilient structure 10 used as a seat cushion having final dimensions of about 36×36×5 inches, one begins with a moderately densified heat bonded low melt fiber batt core 12 of similar length and width dimensions, but with a height of about 10 inches. A moderately densified fiber batt core 12 of these dimensions weighs about 12 ounces. Coil springs 14 having an axial length of about 5 inches are threaded into the fiber batt core 12 in the desired positions, preferably with the ends of the coil springs 14 spaced evenly from the top and bottom surfaces 12a and 12b of the fiber batt core 12. Preferably, the coil springs 14 are 13½ gauge, and have an inside diameter of 1½ inches.

Thereafter, the fiber batt core 12 and coil springs 14 are heated to a temperature of about 335 degrees F for a duration of about two minutes. During heating, the fiber batt core 12 is vertically compressed and held at the desired thickness, i.e., about five inches. Heating of the fiber batt core 12 causes a portion of the low melt fibers therein to melt into contact with and to intersect with the coil springs 14. Thereafter, the fiber batt core 12 is allowed to cool in the compressed state. This causes the surrounding low melt fibers to resolidify or cure and interlock with the coil springs 14 along substantially the entire lengths of the springs 14. In this example, with an initial fiber batt core 12 having a thickness of about 10 inches, a coil spring 14 initial length of about five inches, and a final fiber batt core 12 thickness of about five inches, the coil springs 14 will have a final length of about 4 inches. Thus, the coil springs 14 become partially compressed during the heating and compression stages, and during curing of the low melt fibers, the coil springs 14 are held in this partially compressed state. This partial compression of the coil springs 14 enhances the stability and load bearing capabilities of the fiber batt core 12 and a resilient structure 10 made from the fiber batt core 12, while at the same time providing built-in resilience.

This invention reduces the amount of metal needed to achieve a sturdy yet comfortable resilient structure 10, because the encapsulated coil springs 14 need not be interconnected in a lattice within the resilient structure 10. As a result, this invention eliminates the need to maintain and operate complex and expensive machinery used to form and interconnect anchor springs and border wire normally associated with interconnected wire lattices of this type.

Additionally, because the coil springs 14 may be inserted into the fiber batt core 12 in any position where additional stability and/or resiliency is desired, and the shape of the final resilient structure 10 is only dictated by the shape of the fiber batt core 12, this invention enhances the capability for producing a strategically enhanced densified fiber batt core 12 in almost any desired size or shape.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method of forming a resilient structure comprising the steps of:

locating a coil spring in a desired position in a densified, heat bonded, low melt fiber batt core, the fiber batt core having a desired resiliency and including low melt fibers;

heating one of the densified fiber batt core and said coil spring to melt a portion of the low melt fibers surrounding a substantial length of said coil spring; and allowing the densified fiber batt core and said coil spring to cure to interlock the low melt fibers over the substantial length of said coil spring and hold the coil spring within the densified fiber batt core at the desired position, the substantial length of said coil spring functioning as a part of the fiber batt core when compressed and released, thereby enhancing the desired resiliency of the fiber batt core at the location of the spring wherein the locating step further comprises forming a plurality of hollows in the densified fiber batt core with stamping dies; and placing a coil spring in each of the hollows and wherein the forming step further comprises conveying the core along a production line; and die stamping the hollows into the core as it is conveyed along the production line via dies mounted on an endless conveyor oriented parallel with the production line.

2. A method of making a resilient structure comprising the steps of:

forming a core of moderately densified heat bonded fiber batt having dual-polymer fibers each having a high-melt polymer core surrounded by a low melt outer sheath;

forming a plurality of hollows in the core with stamping dies;

placing a coil spring in each of the hollows;

covering the coil springs with at least one additional layer of moderately densified fiber batting of dual-polymer fibers;

heating the core and said at least one additional layer with the coil springs located therein; and allowing the core and said at least one additional layer to cure to interlock the coil springs therein wherein the hollow forming step further comprises:

conveying the core along a production line;

die stamping the hollows into the core as it is conveyed along the production line via dies mounted on an endless conveyor oriented parallel with the production lines; and die stamping hollows into the additional layer;

and wherein the covering step further comprises inverting the additional layer and placing the additional layer on the core with the hollows in the additional layer aligned with the hollows in the core, with the coil springs enclosed within the hollows.

3. A method of forming a resilient structure comprising the steps of:

inserting a guide element into a densified fiber batt core at a strategic position, the densified fiber batt core containing low melt fibers;

heating the guide element to heat the densified fiber batt core and melt a portion of the low melt fibers surrounding the guide element, the guide element having a shape similar to a coil spring;

removing the guide element from the densified fiber batt core;

thereafter locating a coil spring into the fiber batt core at the strategic position; and allowing the densified fiber batt core and said coil spring to cure to interlock said coil spring with the low melt fibers and hold the coil spring within the densified fiber batt core at the strategic position.

4. The method of claim 3 wherein removal of the guide element and locating of the coil spring occur during a single threading step.

5. The method of claim 4 wherein the guide element is inserted into a first side of the fiber batt core and out a second side thereof, and the coil spring is inserted into the second side of the fiber batt core.

6. The method of claim 5 wherein the guide element comprises a tube and the coil spring fits into an end of the tube at the second side of the fiber batt core.

* * * * *